Patented Sept. 7, 1954

2,688,553

UNITED STATES PATENT OFFICE 2,688,553

LIQUID CHEESE COMPOSITION AND METHOD OF PREPARING THE SAME

George C. Schicks, Upper Montclair, and Edward F. Klein, Perth Amboy, N. J., assignors to Geed, Inc., Perth Amboy, N. J., a corporation of New Jersey No Drawing. Application May 16, 1951, Serial No. 226,728

9 Claims. (Cl. 99—117)

The present invention relates to a liquid cheese composition, and it particularly relates to a liquid cured cheese composition.

Although the present invention may be broadly applied to various cheese compositions even including uncured cheese compositions, it has a particular application to the preparation of stabilized, merchandisable and usable liquid cheese compositions derived from various types of cured cheese.

It is among the objects of the present invention to provide a liquid cheese composition which may be conveniently canned or jarred, said composition being an emulsion which may be sterilized, merchandised and stored, without breaking or deteriorating and which may be utilized as a spread, as a salad dressing, as a flavor and/or carrier for other foodstuffs, and for all other home and industrial applications where a liquid cheese is indicated.

Another object is to provide a cheese material which may be conveniently utilized as a liquid sauce and/or flavoring addition and which will retain the taste and flavor of the cheese and which will preserve such taste and flavor over long periods of time without deterioration even though the packages, cans or jars of the liquid cheese preparation are subjected to varying temperatures and climatic conditions and are stored or shelved over long periods of time.

Another object is to make a novel liquid Cheddar cheese which will give an enhanced Cheddar cheese taste and flavor, which may be conveniently stored and utilized over long periods of time.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to form a combination with a cured cheese, such as Cheddar cheese, of aliphatic polyhydric alcohol having more than three hydroxy groups to which may be added small amounts of food antioxidants, partial high molecular weight fatty acid esters of aliphatic polyhydric alcohols, water soluble gum materials, food and/or flavoring materials, such as olives, peppers, nuts, celery, pimentoes, may be added to the composition.

In the preferred composition, the cheese constitutes from 25% to 50% of the liquid, and the polyhydric alcohol constitutes from 1% to 10%, with water constituting from 50% to 75%.

In the most suitable composition with a 10% to 20% butter fat content, the Cheddar cheese may constitute about 35% to 50% of the composition and the polyhydric alcohol may constitute 1% to 10% of the composition with the water constituting the balance, except for small amounts of the water-soluble gum and water-soluble antioxidant.

EXAMPLE

The formula for the preparation of a typical liquid cheese of 16% butterfat content, pursuant to the invention, is as follows:

| | Range | Preferred |
|---|---|---|
| Cheddar cheese_____gm__ | 40 to 60 | 50 |
| Tragacanth_____gm__ | 0.1 to 0.4 | 0.2 |
| Water soluble antioxidant_____gm__ | 0.1 to 0.5 | 0.35 |
| Hexahydric alcohol solution_____cc__ | 1 to 10 | 3 |
| Water_____cc__ | 50 to 150 | 100 |

In making the above composition, the gum tragacanth, antioxidant and the polyhydric alcohol, such as sorbitol, are dissolved in hot water in the desired proportions. Then the cheese, preferably sharp Cheddar cheese, is ground and then placed in a steam-jacketed kettle at a temperature of 64° to 70° C. Then the solution of gum, tragacanth, the antioxidant and the polyhydric alcohol is added with gradual stirring until the mixture becomes uniform.

This mixture is then passed through an electric homogenizer at about 800 pounds pressure, to assure a uniform product.

If no reflux cooler is employed, the weight may be checked and the water lost by evaporation replaced.

The liquid cheese is passed into cans which are hermetically sealed and sterilized at a temperature of 240° F. for 40 minutes, using 10 pounds pressure, and the product is cooled immediately.

The gum tragacanth acts as a smoothing and amplifying agent and it has been found to be much more satisfactory than pectin, alginates, Irish moss, dextrin, gum arabic, alpha protein, methylcellulose, or similar materials.

The antioxidant is preferably a water or alcohol extract of finely ground oat flour known as Avenex concentrate. Other antioxidants may be used, as, for example, benzoic acid and derivatives thereof, but it has been found that the Avenex concentrate is preferable as it does not have the specific taste of some of the other antioxidants. The antioxidant retards oxidation and prevents development of rancid off-flavors.

The preferred hexahydric alcohol or sorbitol is d-sorbitol and it has been found that this alcohol is superior to mannitol or penta erythritol. Glycol, polyglycol or propylene glycol were found to have disadvantages. The hexahydric alcohol is preferably added in the form of a mixture known as Arlex.

The cans or jars filled with the liquid cheese may be sterilized and stored without change in quality, taste, flavor and appearance. It has been found that there is no substantial change in the composition when stored at varying temperatures at −10° F. to 240° F.

The following is an analysis of an example of one sample composition embodying the invention.

*Analysis*

| Determination | Method, AOAC Section [1] | Result, percent |
|---|---|---|
| Total solids | 15.124 | 30.92 |
| Fat | 15.131 | 14.47 |
| Ash | 15.126 | 1.46 |

[1] Official Methods of Analysis, 7th ed., 1950, of the Association of Official Agricultural Chemists.

Tests with various types of spore mixtures show a high degree of stability of the liquid cheese composition. For example, a liquid cheese composition as prepared above was inoculated with a heat-resistant spore culture. The heat-resistant spore cultures which were used in making the tests were clostridium sporogenes of the American Type Culture collection at Washington, D. C., No. 7955.

After sterilization at 240° F. for 40 minutes at 10 pounds pressure in a container, the cheese was placed in an incubator at 70° F.

After 40 days' incubation, the liquid cheese was tested for sterility and no bacterial growth was observed, indicating that the liquid cheese may be effectively sterilized.

The cheese composition so prepared is an emulsion which flows readily at room temperature and has the consistency of heavy syrup and has a bouquet of Cheddar cheese, is appetizing and pleasing to the eye, and flows readily. Its taste and appearance may be augmented by other flavoring and/or coloring agents.

Cheddar cheese or similar types of cheese may all be employed, in carrying out the invention.

The embodiment of the invention described herein is to be considered merely as illustrative, as the invention is susceptible to variation, modification and change within the spirit and scope of the appended claims.

Having now particularly described and ascertained the nature of the invention, and in what manner the same is to be performed, what is claimed is:

1. A liquid cheese composition comprising water, a mixture of a comminuted cured and/or pasteurized cheese and a hexahydric alcohol.

2. A liquid cheese composition comprising water, a mixture of a comminuted cured and/or pasteurized cheese and d-sorbitol.

3. A liquid cheese composition comprising comminuted Cheddar and/or pasteurized cheese, gum tragacanth, and oat flour extract, a hexahydric alcohol and water.

4. A liquid cheese composition comprising:

| | | |
|---|---|---|
| Comminuted Cheddar cheese | gm | 40 to 60 |
| Tragacanth | gm | 0.1 to 0.4 |
| Water soluble antioxidant | gm | 0.1 to 0.5 |
| Hexahydric alcohol solution | cc | 1 to 10 |
| Water | cc | 50 to 150 |

5. A liquid cheese composition comprising:

| | | Range | Preferred |
|---|---|---|---|
| Comminuted Cheddar cheese | gm | 40 to 60 | 50 |
| Tragacanth | gm | 0.1 to 0.4 | 0.2 |
| Water soluble antioxidant | gm | 0.1 to 0.5 | 0.35 |
| Hexahydric alcohol solution | cc | 1 to 10 | 3 |
| Water | cc | 50 to 150 | 100 |

6. A method of making a liquid cheese composition which comprises dissolving gum tragacanth and a hexahydric alcohol in water, mixing with ground cheese and then homogenizing.

7. A liquid cheese spread which consists of 50 parts of Cheddar cheese, 100 parts of water and 3 parts of sorbitol, all parts being by weight.

8. A liquid cheese composition comprising an aqueous emulsion of comminuted cheese having a hexahydric alcohol dissolved therein.

9. A liquid cheese composition comprising from about 50% to about 75% of water, from about 1% to about 10% of hexahydric alcohol, and from about 25% to about 50% of comminuted cheese, all parts being by weight.

References Cited in the file of this patent

UNITED STATES PATENTS

| Number | Name | Date |
|---|---|---|
| 683,429 | Bell | Oct. 1, 1901 |
| 2,252,170 | Doering | Aug. 12, 1941 |
| 2,279,202 | Musher | Apr. 7, 1942 |

OTHER REFERENCES

"Sorbiton," by W. H. Childs, reprinted from "The Manufacturing Confectioner," October, 1945, pages 26 and 28.

"Mannitol and Sorbitol in Pharmacy," by Speed, reprinted from the American Journal of Pharmacy, Philadelphia, Pa., volume 113, No. 4, April, 1941, pages 5 and 6.